US009215451B2

(12) United States Patent
Fang et al.

(10) Patent No.: US 9,215,451 B2
(45) Date of Patent: Dec. 15, 2015

(54) LIQUID CRYSTAL DISPLAY AND METHOD FOR GENERATING 3D IMAGES BY MATCHING A SOFTWARE OPTICAL GRATING

(71) Applicant: C Vision Technology Co., Ltd., Shenzhen, Guangdong (CN)

(72) Inventors: Tsung-Yau Fang, Tao Yun (TW); Ching-Te Shih, Kaohsiung (TW)

(73) Assignee: C VISION TECHNOLOGY CO., LTD., Shenzhen, Guangdong (CN)

( * ) Notice: Subject to any disclaimer, the term of this patent is extended or adjusted under 35 U.S.C. 154(b) by 245 days.

(21) Appl. No.: 14/096,639

(22) Filed: Dec. 4, 2013

(65) Prior Publication Data

US 2015/0029316 A1 Jan. 29, 2015

(30) Foreign Application Priority Data

Jul. 29, 2013 (TW) .............................. 102127081 A (51) Int. Cl.
*G02F 1/1335* (2006.01)
*H04N 13/04* (2006.01)

(52) U.S. Cl.
CPC ....... *H04N 13/0409* (2013.01); *H04N 13/0404* (2013.01); *H04N 13/0415* (2013.01)

(58) Field of Classification Search
CPC ........... H04N 13/0409; H04N 13/0404; G02B 27/2214
See application file for complete search history.

(56) References Cited

U.S. PATENT DOCUMENTS

2014/0354785 A1* 12/2014 Fang .................. H04N 13/0402
348/51

* cited by examiner

*Primary Examiner* — Dung Nguyen
(74) *Attorney, Agent, or Firm* — Li & Cai Intellectual Property (USA) Office (57) ABSTRACT

A liquid crystal display for generating 3D images by matching a software optical grating includes a backlight module and a LCD panel having a color filter. The LCD panel has a plurality of first subpixels for generating a first image, a plurality of second subpixels for generating a second image, and a plurality of third subpixels for generating a black barrier image as the software optical grating. When the black barrier image is slightly spread to cover one part of the first image and one part of the second image, the first image is covered partially by the black barrier image to form a right-eye image, and the second image is covered partially by the black barrier image to form a left-eye image. Whereby, the right-eye and the left-eye images concurrently generated by the LCD are respectively projected onto the right and the left eyes of the viewer.

12 Claims, 6 Drawing Sheets

LIQUID CRYSTAL DISPLAY AND METHOD FOR GENERATING 3D IMAGES BY MATCHING A SOFTWARE OPTICAL GRATING

BACKGROUND OF THE INVENTION

1. Field of the Invention

The instant disclosure relates to a liquid crystal display and a method for generating 3D images, and more particularly to a liquid crystal display and a method for generating 3D images by matching a software optical grating.

2. Description of Related Art

Generally, stereoscopic images with three-dimensional (3D) effects are possible based on the theory of stereo-eyesight by both eyes. An important factor for a three dimensional effect is the difference in optical angles of a person's two eyes, due to a distance of 65 mm therebetween, i.e., a parallax of the eyes. That is, each of the eyes respectively sees two different two-dimensional images, and when said two images are transferred via retina to the brain, the brain combines said transferred two images and reproduces the original three-dimensional image with sense of depth and sense of reality. This is generally referred to stereography.

A stereoscopic image display apparatus is classified into two generic types based on whether a user should wear a specific pair of glasses or not: a glasses-type of stereoscopic image display apparatus (stereoscopic image display apparatus) and a non-glasses-type of stereoscopic image display apparatus (auto-stereoscopic image display apparatus). The stereoscopic image display apparatus gives a watcher inconvenience of wearing special glasses, while the auto-stereoscopic image display apparatus allows a watcher to enjoy three-dimensional images only by directly watching the screen even without wearing said glasses, and thereby the auto-stereoscopic image display apparatus solves problems with the stereoscopic image display apparatus. Therefore, there are many studies on the auto-stereoscopic image display apparatus going on nowadays. The auto-stereoscopic image display apparatus again can be classified into two generic types: apparatus by the lenticular method and apparatus by the parallax-barrier method.

Operation of the stereoscopic image display apparatus by the conventional parallax-barrier method are explained as follows. The stereoscopic image display apparatus by the conventional parallax-barrier method comprises a display module, wherein the left image and the right image respectively corresponding to the left eye and the right eye face towards the vertical direction and are disposed alternately in the horizontal direction; and a blocking film in the form of a bar which is called a barrier, disposed at the front end and facing towards the vertical direction. This kind of stereoscopic image display apparatus has a system wherein said display module and barrier are disposed so as that the light for the left image goes only into the left eye, and the light for the right image goes only into the right eye, and thereby the divided two left and right images are separately observed to give the stereoscopic sense.

SUMMARY OF THE INVENTION

One aspect of the instant disclosure relates to a liquid crystal display and a method for generating 3D images by matching a software optical grating.

One of the embodiments of the instant disclosure provides a liquid crystal display for generating 3D images by matching a software optical grating, comprising: a backlight module for generating a light source and a LCD panel including a color filter and adjacent to the backlight module. The LCD panel includes a plurality of first pixels, a plurality of second pixels and a plurality of third pixels, and the first pixels, the second pixels and the third pixels are adjacent to each other and arranged as a matrix, wherein each first pixel has at least three first subpixels adjacent to each other, each second pixel has at least three second subpixels adjacent to each other, and each third pixel has at least one third subpixel. Wherein, one part of the light source generated by the backlight module passes through the first subpixels of the first pixels, thus the first subpixels of the first pixels are mated with each other for generating a first image. Another part of the light source generated by the backlight module passes through the second subpixels of the second pixels, thus the second subpixels of the second pixels are mated with each other for generating a second image. The other light source generated by the backlight module is shielded by a polarizing sheet of the LCD panel to limit the other light source to pass through the third subpixels of the third pixels, thus the third subpixels of the third pixels are mated with each other for generating a black barrier image as the software optical grating. Whereby, when the first image, the second image and the black barrier image are concurrently generated by the liquid crystal display, the black barrier image is slightly spread to cover one part of the first image and one part of the second image, thus the first image is covered partially by the black barrier image for generating a right-eye image, the second image is covered partially by the black barrier image for generating a left-eye image, and the right-eye image and the left-eye image are concurrently generated by the liquid crystal display and respectively projected onto a right eye and a left eye of a viewer.

More precisely, the at least three first subpixels of each first pixel are composed of a first red subpixel, a first green subpixel and a first blue subpixel, the at least three second subpixels of each second pixel are composed of a second red subpixel, a second green subpixel and a second blue subpixel, and the at least one third subpixel of each third pixel is one of a third red subpixel, a third green subpixel and a third blue subpixel. The black barrier image is composed of a plurality of inclined shapes.

Another one of the embodiments of the instant disclosure provides a liquid crystal display for generating 3D images by matching a software optical grating, comprising: a backlight module for generating a light source and a LCD panel including a color filter and adjacent to the backlight module, wherein the LCD panel includes a plurality of first subpixels mated with each other for generating a first image, a plurality of second subpixels mated with each other for generating a second image, and a plurality of third subpixels mated with each other for generating a black barrier image as the software optical grating, and the first subpixels, the second subpixels and the third subpixels are arranged as a matrix. Whereby, when the first image, the second image and the black barrier image are concurrently generated by the liquid crystal display, the black barrier image is slightly spread to cover one part of the first image and one part of the second image, thus the first image is covered partially by the black barrier image for generating a right-eye image, the second image is covered partially by the black barrier image for generating a left-eye image, and the right-eye image and the left-eye image are concurrently generated by the liquid crystal display and respectively projected onto a right eye and a left eye of a viewer.

More precisely, each first pixel has at least three first subpixels adjacent to each other, each second pixel has at least three second subpixels adjacent to each other, and each third pixel has at least one third subpixel, wherein one part of the light source generated by the backlight module passes through the first subpixels of the first pixels, thus the first subpixels of the first pixels are mated with each other for generating a first image, wherein another part of the light source generated by the backlight module passes through the second subpixels of the second pixels, thus the second subpixels of the second pixels are mated with each other for generating a second image, wherein the other light source generated by the backlight module is shielded by a polarizing sheet of the LCD panel to limit the other light source to pass through the third subpixels of the third pixels, thus the third subpixels of the third pixels are mated with each other for generating a black barrier image as the software optical grating.

Yet another one of the embodiments of the instant disclosure provides a method for generating 3D images by matching a software optical grating, comprising: providing a liquid crystal display including a backlight module for generating a light source and a LCD panel including a color filter and adjacent to the backlight module, wherein the LCD panel includes a plurality of first pixels, a plurality of second pixels and a plurality of third pixels, and the first pixels, the second pixels and the third pixels are adjacent to each other and arranged as a matrix, wherein each first pixel has at least three first subpixels adjacent to each other, each second pixel has at least three second subpixels adjacent to each other, and each third pixel has at least one third subpixel; switching the liquid crystal display to a 2D image display mode or a 3D image display mode, wherein when the liquid crystal display is switched to the 3D image display mode, the first subpixels of the first pixels are mated with each other for generating a first image, the second subpixels of the second pixels are mated with each other for generating a second image, and the third subpixels of the third pixels are mated with each other for generating a black barrier image as the software optical grating, wherein when the first image, the second image and the black barrier image are concurrently generated by the liquid crystal display, the black barrier image is slightly spread to cover one part of the first image and one part of the second image; and then partially covering the first image by the black barrier image for generating a right-eye image, and partially covering the second image by the black barrier image for generating a left-eye image, wherein the right-eye image and the left-eye image are concurrently generated by the liquid crystal display and respectively projected onto a right eye and a left eye of a viewer.

More precisely, when the liquid crystal display is switched to the 2D image display mode, the light source generated by the liquid crystal display concurrently passes through the first subpixels of the first pixels, the second subpixels of the second pixels and the third subpixels of the third pixels, thus the first subpixels of the first pixels, the second subpixels of the second pixels and the third subpixels of the third pixels are mated with each other for generating 2D images.

Therefore, the black barrier image can be slightly and outwardly spread to cover one part of the first image and one part of the second image, thus the first image is covered partially by the black barrier image for generating a right-eye image, and the second image is covered partially by the black barrier image for generating a left-eye image. Whereby, when the right-eye image and the left-eye image are concurrently generated by the liquid crystal display, the right-eye image and the left-eye image can be respectively projected onto the right eye and the left eye of the viewer, thus the liquid crystal display can provide 3D images for the viewer.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Referring to FIG. 1 to FIG. 5, where the instant disclosure provides a liquid crystal display Z (such as a TFT LCD) for generating 3D images by matching a software optical grating, comprising: a backlight module 1 for generating a light source and a LCD panel 2.

Figure 1:
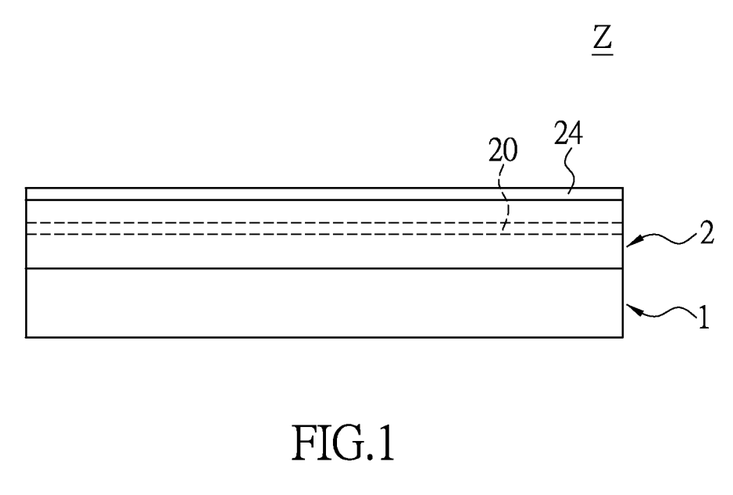
FIG. 1 shows a schematic view of the liquid crystal display according to the instant disclosure.
Figure 2:
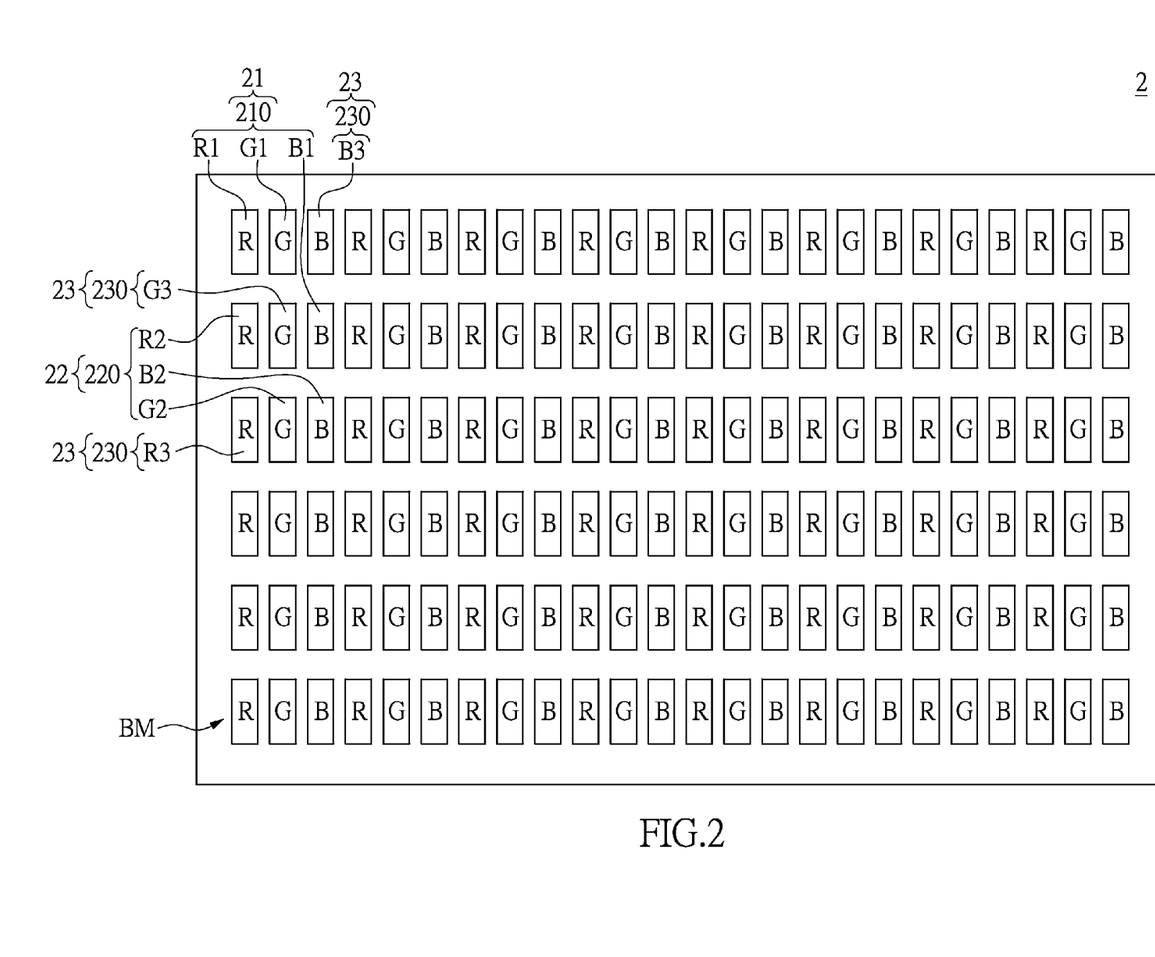
FIG. 2 shows a schematic view of the liquid crystal display including a LCD panel having a plurality of first, second and third pixels arranged as a matrix according to the instant disclosure.

First, referring to FIG. 1 and FIG. 2, the backlight module 1 may be a direct type backlight module or an edge-lit backlight module. The LCD panel 2 includes a color filter 20 and is adjacent to the backlight module 1 (such as the LCD panel 2 is disposed on the backlight module 1) for receiving the white light source generated by the backlight module 1. Referring to FIG. 2, the LCD panel 2 includes a plurality of first pixels 21, a plurality of second pixels 22 and a plurality of third pixels 23, and the first pixels 21, the second pixels 22 and the third pixels 23 are adjacent to each other and arranged as a matrix. Each first pixel 21 has at least three first subpixels 210 adjacent to each other, each second pixel 22 has at least three second subpixels 220 adjacent to each other, and each third pixel 23 has at least one third subpixel 230. More precisely, the at least three first subpixels 210 of each first pixel 21 are composed of a first red subpixel R1, a first green subpixel G1 and a first blue subpixel B1, the at least three second subpixels 220 of each second pixel 22 are composed of a second red subpixel R2, a second green subpixel G2 and a second blue subpixel B2, and the at least one third subpixel 230 of each third pixel 23 is one of a third red subpixel R3, a third green subpixel G3 and a third blue subpixel B3. However, the above-mentioned design for the first pixels 21, the second pixels 22 and the third pixels 23 in this embodiment is merely an example and is not meant to limit the instant disclosure.

Figure 3:
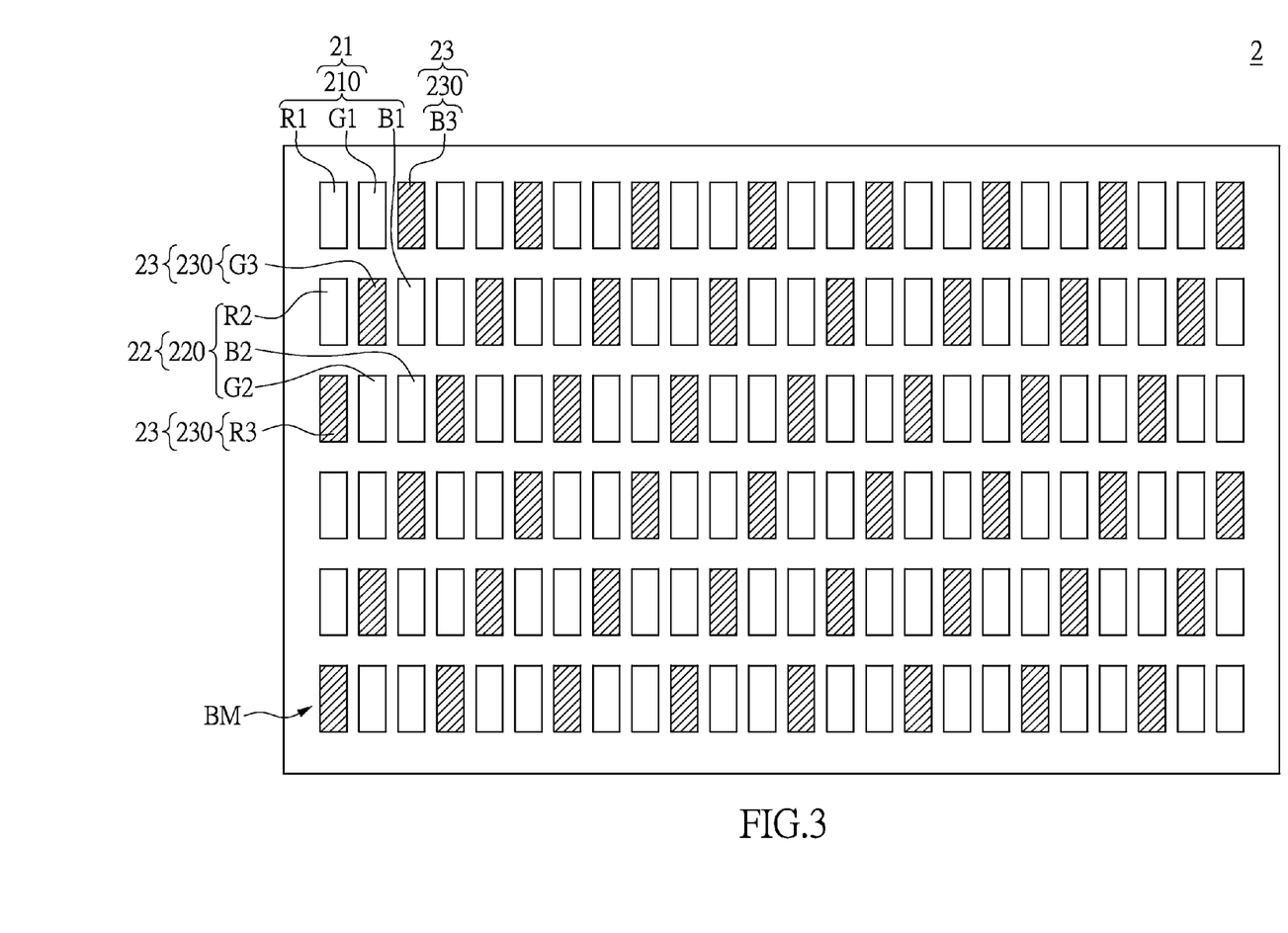
FIG. 3 shows a schematic view of the liquid crystal display including a LCD panel having a plurality of third pixels arranged as a black barrier image according to the instant disclosure.
Figure 4:
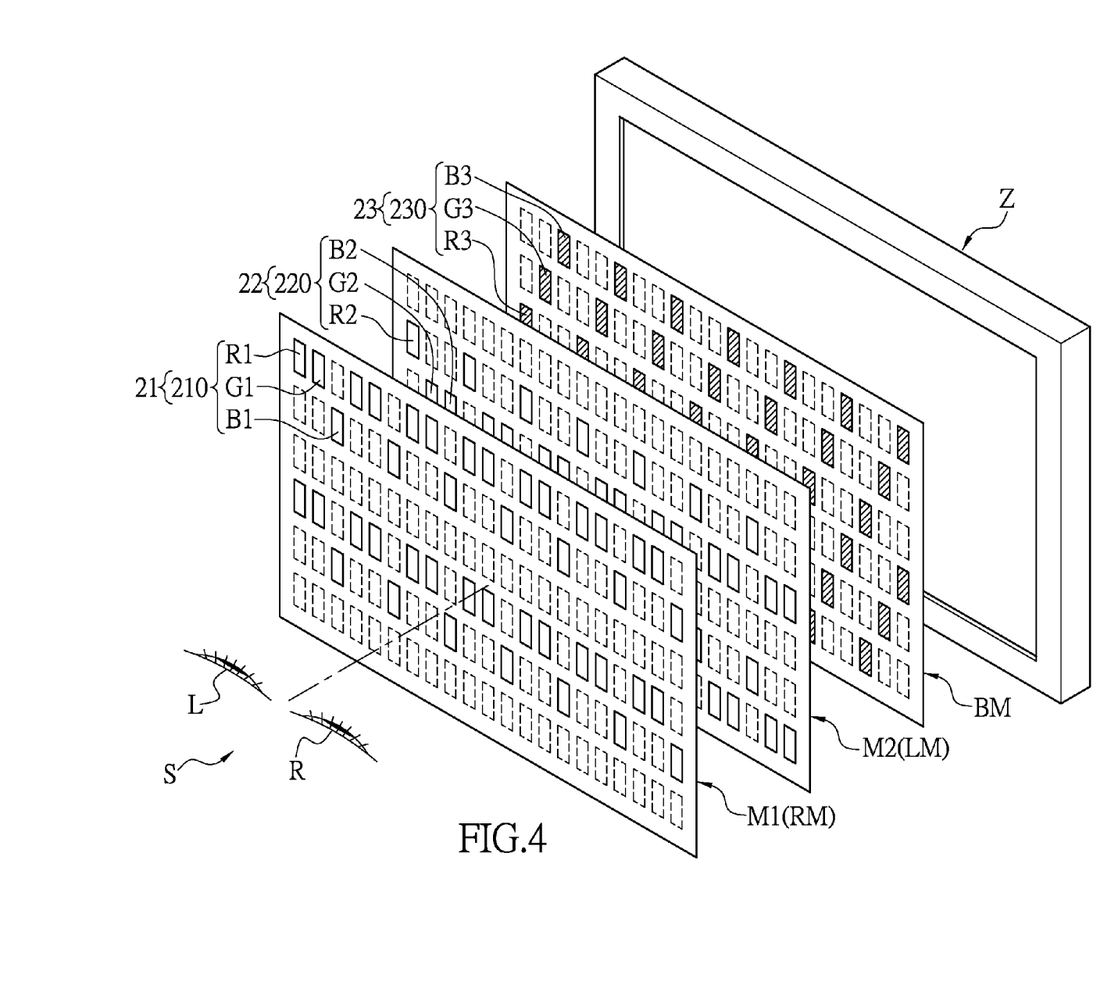
FIG. 4 shows a perspective, schematic view of the liquid crystal display for concurrently generating the first image (the right-eye image), the second image (the left-eye image) and the black barrier image according to the instant disclosure.
Figure 5:
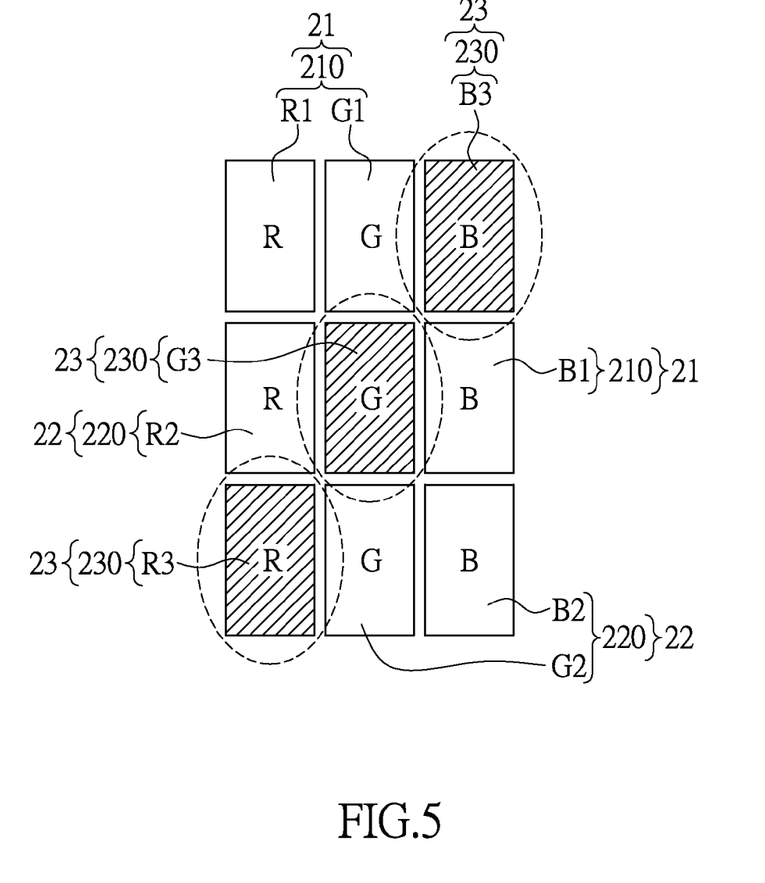
FIG. 5 shows a schematic view of the black barrier image slightly and outwardly spread to cover one part of the first image and one part of the second image according to the instant disclosure.

Moreover, referring to FIG. 3, FIG. 4 and FIG. 5, one part of the light source generated by the backlight module 1 passes through the first subpixels 210 of the first pixels 21, thus the first subpixels 210 of the first pixels 21 are mated with each other for generating a first image M1. Another part of the light source generated by the backlight module 1 passes through the second subpixels 220 of the second pixels 22, thus the second subpixels 220 of the second pixels 22 are mated with each other for generating a second image M2. The other light source generated by the backlight module 1 is shielded by a polarizing sheet 24 of the LCD panel 2 to limit the other light source to pass through the third subpixels 230 of the third pixels 23 (i.e., the other light source generated by the backlight module 1 is shielded by the polarizing sheet 24 (as shown in FIG. 1) of the LCD panel 2, so that the other light source generated by the backlight module 1 cannot pass through the third subpixels 230 of the third pixels 23), thus the third subpixels 230 of the third pixels 23 are mated with each other for generating a black barrier image BM as the software optical grating. For example, the black barrier image BM composed of the third subpixels 230 of the third pixels 23 may be arranged as a plurality of inclined shapes. In other words, referring to FIG. 3 and FIG. 4, the LCD panel 2 includes a plurality of first subpixels 210 mated with each other for generating a first image M1, a plurality of second subpixels 220 mated with each other for generating a second image M2, and a plurality of third subpixels 230 mated with each other for generating a black barrier image BM as the software optical grating, and the first subpixels 210, the second subpixels 220 and the third subpixels 230 are arranged as a matrix.

For example, according to different designs for the polarizing sheet 24, when the voltage is provided for the LCD panel 2, the liquid-crystal molecules inside the LCD panel 2 cannot be deflected, thus the light source generated by the backlight module 1 cannot pass through the polarizing sheet 24 of the LCD panel 2, and then the third subpixels 230 of the third pixels 23 can be mated with each other for generating the black barrier image BM as the software optical grating. Alternatively, when the voltage is provided for the LCD panel 2, the liquid-crystal molecules inside the LCD panel 2 can be deflected by 90 degrees, thus the light source generated by the backlight module 1 cannot pass through the polarizing sheet 24 of the LCD panel 2, and then the third subpixels 230 of the third pixels 23 can be mated with each other for generating the black barrier image BM as the software optical grating.

More precisely, referring to FIG. 4 and FIG. 5, when the first image M1, the second image M2 and the black barrier image BM are concurrently generated by the liquid crystal display Z and are overlapping, the black barrier image BM is slightly and outwardly spread to form an outward diffusion region surrounded by the dotted line area as shown in FIG. 5 for covering one part of the first image M1 (such as one part of each first subpixel 210) and one part of the second image M2 (such as one part of each second subpixel 220). Whereby, the first image M1 can be covered partially by the black barrier image BM for generating a right-eye image RM, the second image M2 can be covered partially by the black barrier image BM for generating a left-eye image LM, and the right-eye image RM and the left-eye image LM can be concurrently generated by the liquid crystal display Z and respectively projected onto a right eye R and a left eye M of a viewer S, thus the liquid crystal display Z can provide 3D images for the viewer S.

Figure 6:
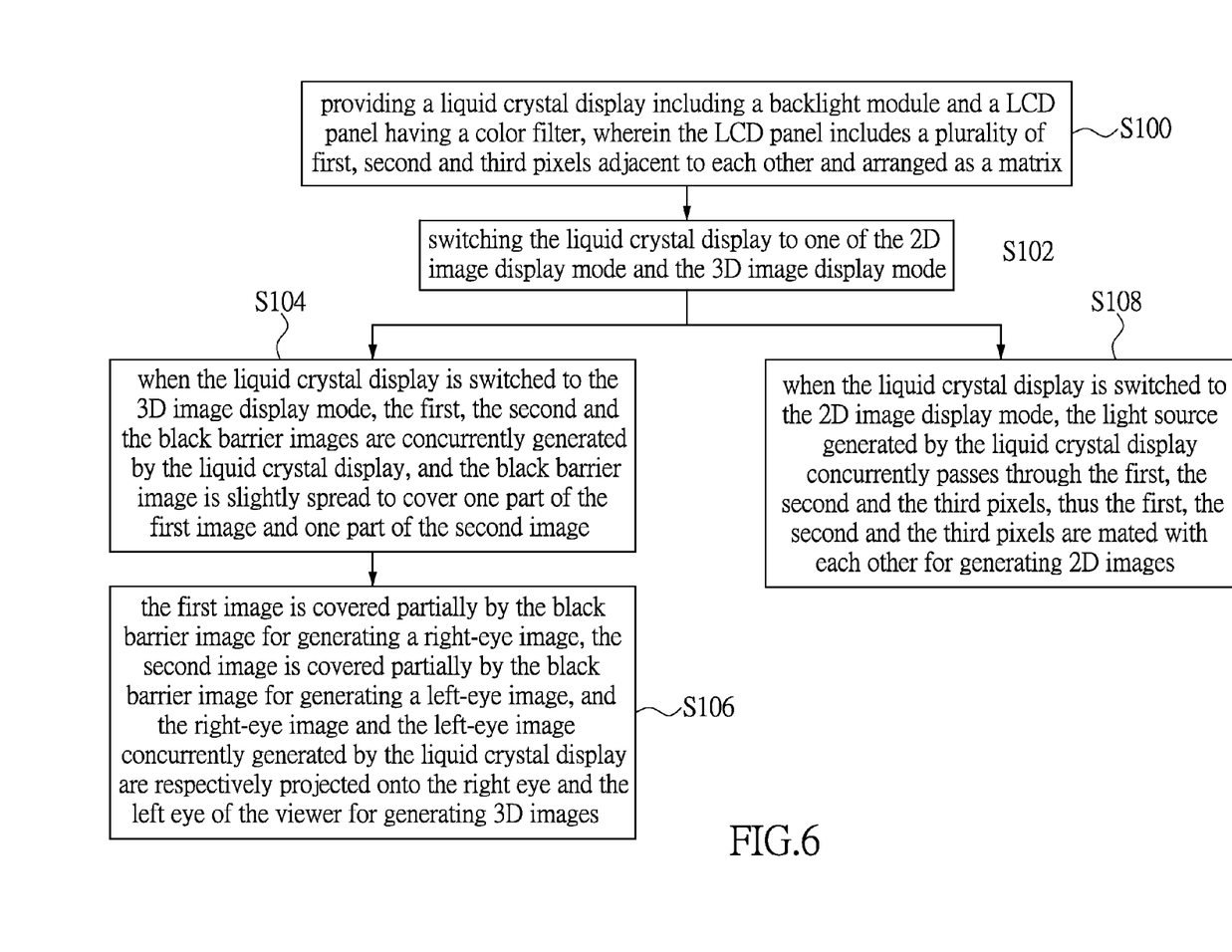
FIG. 6 shows a flow chart of the method for generating 3D images by matching a software optical grating according to the instant disclosure.

Furthermore, referring to FIG. 6, where the instant disclosure provides a method for generating 3D images by matching a software optical grating, comprising the following steps:

First, the step S100 is that: referring to FIG. 1, FIG. 2 and FIG. 6, providing a liquid crystal display Z including a backlight module 1 for generating a light source and a LCD panel 2 having a color filter 20 and adjacent to the backlight module 1, wherein the LCD panel 2 includes a plurality of first pixels 21, a plurality of second pixels 22 and a plurality of third pixels 23, and the first pixels 21, the second pixels 22 and the third pixels 23 are adjacent to each other and arranged as a matrix. Each first pixel 21 has at least three first subpixels 210 adjacent to each other, each second pixel 22 has at least three second subpixels 220 adjacent to each other, and each third pixel 23 has at least one third subpixel 230.

Next, the step S102 is that: referring to FIG. 1 and FIG. 6, switching the liquid crystal display Z to a 2D image display mode or a 3D image display mode.

Afterward, the step S104 is that: referring to FIG. 3, FIG. 4, FIG. 5 and FIG. 6, when the liquid crystal display Z is switched to the 3D image display mode, one part of the light source generated by the backlight module 1 passes through the first subpixels 210 of the first pixels 21 for generating a first image M1, another part of the light source generated by the backlight module 1 passes through the second subpixels 220 of the second pixels 22 for generating the second image M2, and the other light source generated by the backlight module 1 is shielded by a polarizing sheet 24 of the LCD panel 2 to limit the other light source to pass through the third subpixels 230 of the third pixels 23 for generating the black barrier image BM as the software optical grating. More precisely, when the first image M1, the second image M2 and the black barrier image BM are concurrently generated by the liquid crystal display Z, the black barrier image BM is slightly spread to cover one part of the first image M1 and one part of the second image M2.

Subsequently, the step S106 is that: referring to FIG. 4, FIG. 5 and FIG. 6, partially covering the first image M1 by the black barrier image BM for generating a right-eye image RM, and partially covering the second image M2 by the black barrier image BM for generating a left-eye image LM, wherein the right-eye image RM and the left-eye image LM are concurrently generated by the liquid crystal display Z and respectively projected onto a right eye R and a left eye L of a viewer S, thus the liquid crystal display Z can provide 3D images for the viewer S.

More precisely, the step S108 is that: referring to FIG. 4, FIG. 5 and FIG. 6, when the liquid crystal display Z is switched to the 2D image display mode, the light source generated by the liquid crystal display Z concurrently passes through the first subpixels 210 of the first pixels 21, the second subpixels 220 of the second pixels 22 and the third subpixels 230 of the third pixels 23, thus the first subpixels 210 of the first pixels 21, the second subpixels 220 of the second pixels 22 and the third subpixels 230 of the third pixels 23 are mated with each other for generating 2D images, thus the liquid crystal display Z can provide 2D images for the viewer S.

In conclusion, the black barrier image BM can be slightly and outwardly spread to cover one part of the first image M1 and one part of the second image M2, thus the first image M1 is covered partially by the black barrier image BM for generating a right-eye image RM, and the second image M2 is covered partially by the black barrier image BM for generating a left-eye image LM. Whereby, when the right-eye image RM and the left-eye image LM are concurrently generated by the liquid crystal display Z, the right-eye image RM and the left-eye image LM can be respectively projected onto the right eye R and the left eye L of the viewer S, thus the liquid crystal display Z can provide 3D images for the viewer S.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A liquid crystal display for generating 3D images by matching a software optical grating, comprising:
   a backlight module for generating a light source; and
   a LCD panel including a color filter and adjacent to the backlight module, wherein the LCD panel includes a plurality of first pixels, a plurality of second pixels and a plurality of third pixels, and the first pixels, the second pixels and the third pixels are adjacent to each other and arranged as a matrix, wherein each first pixel has at least three first subpixels adjacent to each other, each second pixel has at least three second subpixels adjacent to each other, and each third pixel has at least one third subpixel;
   wherein one part of the light source generated by the backlight module passes through the first subpixels of the first pixels, thus the first subpixels of the first pixels are mated with each other for generating a first image;
   wherein another part of the light source generated by the backlight module passes through the second subpixels of the second pixels, thus the second subpixels of the second pixels are mated with each other for generating a second image;
   wherein the other light source generated by the backlight module is shielded by a polarizing sheet of the LCD panel to limit the other light source to pass through the third subpixels of the third pixels, thus the third subpixels of the third pixels are mated with each other for generating a black barrier image as the software optical grating;
   wherein when the first image, the second image and the black barrier image are concurrently generated by the liquid crystal display, the black barrier image is slightly spread to cover one part of the first image and one part of the second image, thus the first image is covered partially by the black barrier image for generating a right-eye image, the second image is covered partially by the black barrier image for generating a left-eye image, and the right-eye image and the left-eye image are concurrently generated by the liquid crystal display and respectively projected onto a right eye and a left eye of a viewer.

2. The liquid crystal display of claim 1, wherein the at least three first subpixels of each first pixel are composed of a first red subpixel, a first green subpixel and a first blue subpixel, the at least three second subpixels of each second pixel are composed of a second red subpixel, a second green subpixel and a second blue subpixel, and the at least one third subpixel of each third pixel is one of a third red subpixel, a third green subpixel and a third blue subpixel.

3. The liquid crystal display of claim 1, wherein the black barrier image is composed of a plurality of inclined shapes.

4. A liquid crystal display for generating 3D images by matching a software optical grating, comprising:
   a backlight module for generating a light source; and
   a LCD panel including a color filter and adjacent to the backlight module, wherein the LCD panel includes a plurality of first subpixels mated with each other for generating a first image, a plurality of second subpixels mated with each other for generating a second image, and a plurality of third subpixels mated with each other for generating a black barrier image as the software optical grating, and the first subpixels, the second subpixels and the third subpixels are arranged as a matrix;
   wherein when the first image, the second image and the black barrier image are concurrently generated by the liquid crystal display, the black barrier image is slightly spread to cover one part of the first image and one part of the second image, thus the first image is covered partially by the black barrier image for generating a right-eye image, the second image is covered partially by the black barrier image for generating a left-eye image, and the right-eye image and the left-eye image are concurrently generated by the liquid crystal display and respectively projected onto a right eye and a left eye of a viewer.

5. The liquid crystal display of claim 4, wherein each first pixel has at least three first subpixels adjacent to each other, each second pixel has at least three second subpixels adjacent to each other, and each third pixel has at least one third subpixel, wherein one part of the light source generated by the backlight module passes through the first subpixels of the first pixels, thus the first subpixels of the first pixels are mated with each other for generating a first image, wherein another part of the light source generated by the backlight module passes through the second subpixels of the second pixels, thus the second subpixels of the second pixels are mated with each other for generating a second image, wherein the other light source generated by the backlight module is shielded by a polarizing sheet of the LCD panel to limit the other light source to pass through the third subpixels of the third pixels, thus the third subpixels of the third pixels are mated with each other for generating a black barrier image as the software optical grating.

6. The liquid crystal display of claim 5, wherein the at least three first subpixels of each first pixel are composed of a first red subpixel, a first green subpixel and a first blue subpixel, the at least three second subpixels of each second pixel are composed of a second red subpixel, a second green subpixel and a second blue subpixel, and the at least one third subpixel of each third pixel is one of a third red subpixel, a third green subpixel and a third blue subpixel.

7. The liquid crystal display of claim 4, wherein the black barrier image is composed of a plurality of inclined shapes.

8. A method for generating 3D images by matching a software optical grating, comprising:
   providing a liquid crystal display including a backlight module for generating a light source and a LCD panel including a color filter and adjacent to the backlight module, wherein the LCD panel includes a plurality of first pixels, a plurality of second pixels and a plurality of third pixels, and the first pixels, the second pixels and the third pixels are adjacent to each other and arranged as a matrix, wherein each first pixel has at least three first subpixels adjacent to each other, each second pixel has at least three second subpixels adjacent to each other, and each third pixel has at least one third subpixel;
   switching the liquid crystal display to a 2D image display mode or a 3D image display mode, wherein when the liquid crystal display is switched to the 3D image display mode, the first subpixels of the first pixels are mated with each other for generating a first image, the second subpixels of the second pixels are mated with each other for generating a second image, and the third subpixels of the third pixels are mated with each other for generating a black barrier image as the software optical grating, wherein when the first image, the second image and the black barrier image are concurrently generated by the liquid crystal display, the black barrier image is slightly spread to cover one part of the first image and one part of the second image; and partially covering the first image by the black barrier image for generating a right-eye image, and partially covering the second image by the black barrier image for generating a left-eye image, wherein the right-eye image and the left-eye image are concurrently generated by the liquid crystal display and respectively projected onto a right eye and a left eye of a viewer.

9. The method of claim 8, wherein one part of the light source generated by the backlight module passes through the first subpixels of the first pixels, thus the first subpixels of the first pixels are mated with each other for generating a first image, wherein another part of the light source generated by the backlight module passes through the second subpixels of the second pixels, thus the second subpixels of the second pixels are mated with each other for generating a second image, wherein the other light source generated by the backlight module is shielded by a polarizing sheet of the LCD panel to limit the other light source to pass through the third subpixels of the third pixels, thus the third subpixels of the third pixels are mated with each other for generating a black barrier image as the software optical grating.

10. The method of claim 8, wherein the at least three first subpixels of each first pixel are composed of a first red subpixel, a first green subpixel and a first blue subpixel, the at least three second subpixels of each second pixel are composed of a second red subpixel, a second green subpixel and a second blue subpixel, and the at least one third subpixel of each third pixel is one of a third red subpixel, a third green subpixel and a third blue subpixel.

11. The method of claim 8, wherein the black barrier image is composed of a plurality of inclined shapes.

12. The method of claim 8, wherein when the liquid crystal display is switched to the 2D image display mode, the light source generated by the liquid crystal display concurrently passes through the first subpixels of the first pixels, the second subpixels of the second pixels and the third subpixels of the third pixels, thus the first subpixels of the first pixels, the second subpixels of the second pixels and the third subpixels of the third pixels are mated with each other for generating 2D images.

* * * * *